United States Patent

Tressa

[15] 3,696,429

[45] Oct. 3, 1972

[54] SIGNAL CANCELLATION SYSTEM

[72] Inventor: Frank J. Tressa, Deer Park, N.Y.

[73] Assignee: Cutler-Hammer, Inc., Milwaukee, Wis.

[22] Filed: May 24, 1971

[21] Appl. No.: 146,277

[52] U.S. Cl...................343/180, 179/170 A, 325/12, 325/21, 325/22, 325/42, 325/65, 325/444, 329/50, 329/166, 333/18

[51] Int. Cl.................................................H04l 5/00

[58] Field of Search..........179/15 BC, 170 A, 170 R; 325/12, 42, 65, 21, 22, 49, 60, 329, 444, 346; 329/50, 122, 166, 168; 333/4, 14–18; 343/180

[56] References Cited

UNITED STATES PATENTS 1,703,142 9/1927 Green..........................333/18

*Primary Examiner*—Albert J. Mayer

*Attorney*—Henry Huff

[57] ABSTRACT

An unwanted r-f signal produced on a receiver line by a nearby transmitter is reduced by adding to it a sample of the transmitted signal, automatically adjusted in phase and amplitude to cancel the unwanted signal.

5 Claims, 3 Drawing Figures

INVENTOR.
FRANK J. TRESSA
BY Henry Huff
ATTORNEY

INVENTOR.
FRANK J. TRESSA
BY Henry Huff
ATTORNEY

SIGNAL CANCELLATION SYSTEM

BACKGROUND

1. Field

The invention pertains to radio communication systems wherein a receiver is required to operate simultaneously with a nearby transmitter, as in a relay or repeater, and more particularly to apparatus for automatic compensation of feedback from the transmitter to the receiver.

2. Prior Art

Many known arrangements are used to reduce interference by a transmitter with the simultaneous operation of a nearby receiver. These include such expedients as separate directive antennas, balanced networks or hybrids, non-reciprocal isolators or circulators, and filters. None of the foregoing are entirely satisfactory where the transmitter must operate at the same or nearly the same carrier frequency as the receiver, with the same data or intelligence modulation, as in certain types of repeaters. The maximum usable gain of such repeaters is restricted to somewhat less than the attenuation of transmitter-receiver feedback, which tends to vary with unpredictable variations in frequency and ambient conditions.

SUMMARY

According to this invention, a sample of the transmitted signal is split into two quadrature components which are separately adjusted in amplitude and sign, then combined with the undesired received signal, producing a resultant which ideally should be made to approach zero. The actually existing resultant is split into two quadrature components which are separately detected and used as error signals in closed servo loops that adjust the respective components of the transmitted signal sample, driving the resultant to a null. The system operates continuously to maintain the null in the presence of wide variations in the transmitter to receiver coupling, such as result from frequency modulation of the transmitter and varying ambient conditions, for example moving reflective objects in the antenna fields.

In a simple basic embodiment of the invention, the receiver can operate usefully to receive weak signals of frequencies within a few hundred Hertz of that of the nearby transmitter. If the receiver is required to operate at exactly the same frequency, it is necessary to distinguish the local transmitter signals from those arriving from some other source. In a modification of the basic embodiment, the local transmitter is identified by a tag modulation signal which is separated from other signals on the receiver line to provide the error signals.

DRAWINGS

DESCRIPTION

Figure 1:
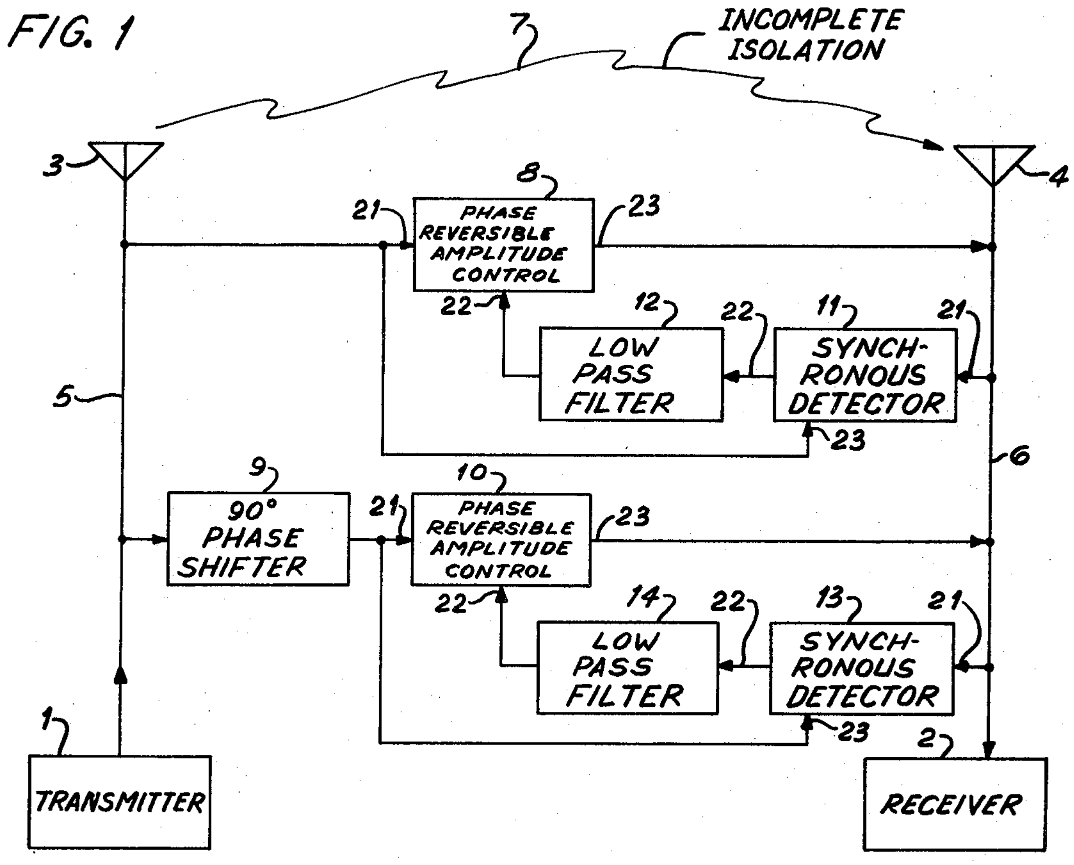
FIG. 1 is a simplified block diagram of a radio transmitter - receiver system illustrating a basic embodiment of the invention.

Referring to FIG. 1, a transmitter 1 and a receiver 2 are coupled to antennas 3 and 4 by way of lines 5 and 6 respectively. The antennas are electrically isolated from each other to whatever extent is practically feasible under the circumstances, as by shielding, directivity, or other known expedients. Nevertheless there remains a certain amount of residual coupling, as indicated by the line 7, denoted "incomplete isolation". This residual coupling places a limit on how weak a signal the receiver 2 can usefully receive from some other source while the transmitter 1 is operating, and it tends to vary unpredictably owing for example to reflections from moving objects such as vehicles in the radiation field.

The transmitter line 5 is coupled to the receiver line 6 through a phase reversible amplitude control device 8, and also through a 90° phase shifter 9 and another phase reversible amplitude control device 10. A synchronous detector 11 is connected to receive inputs from lines 5 and 6 and to provide an output which is applied through a low pass filter 12 as a control signal input to the device 8. Another synchronous detector 13 is similarly connected to the output of phase shifter 9 and line 6, and through a low pass filter 14 to the device 10.

Figure 2:
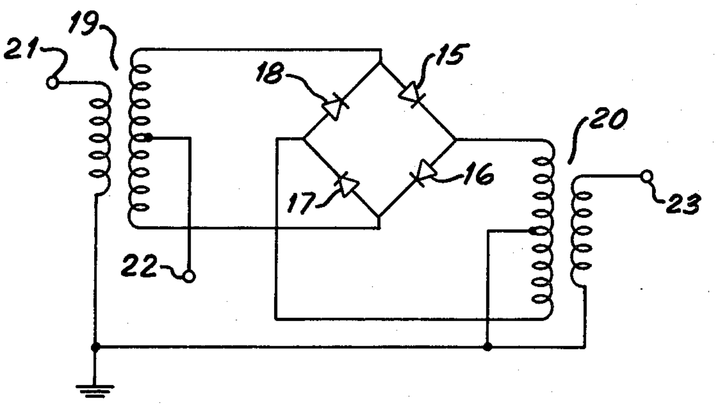
FIG. 2 is a schematic diagram of a circuit suitable for use in several of the elements of the system.

The circuits of the phase reversible amplitude control devices 8 and 10, and of the synchronous detectors 11 and 13, may all be of the type illustrated in FIG. 2, comprising four unilaterally conductive diodes 15, 16, 17 and 18 interconnected as shown between the center-tapped windings of transformers 19 and 20. The circuit has three external terminals 21, 22 and 23. For amplitude and phase sense control, 21 and 23 are used as r-f input and output terminals, and 22 is used as the control input terminal.

A positive control voltage applied to terminal 22 acts as a forward bias on diodes 15 and 17 and as a back bias on diodes 16 and 18. Diodes 15 and 17 conduct to a degree that depends upon the magnitude of the control voltage, acting as variable resistors connecting transformer 19 directly to transformer 20. A negative control voltage back biases diodes 15 and 17 and forward biases diodes 16 and 18, which then act as variable resistors cross-connecting transformers 19 and 20. Accordingly, r-f input at terminal 21 produces output at terminal 23 which has an amplitude that depends on the magnitude of the control voltage and a phase sense, forward or reversed, that depends on the polarity of the control voltage.

For synchronous detection, the input signal to be detected is applied to one of terminals 21 and 23, and a reference signal is applied to the other. The reference signal acts as a switching control, cyclically reversing the connection of the input to the output terminal 22. When the input and reference signals are of the same frequency, the output includes a d-c voltage of a magnitude corresponding to the amplitude of the component of the input signal that is in phase agreement or in phase opposition with the reference signal, and a polarity that depends upon the phase sense. In this case, the connections are made so that the output polarity is negative when the input has a component in phase with the reference, and positive when the input has a component 180° out of phase with the reference.

Returning to FIG. 1, the input and output terminals of devices 8, 10, 11 and 13 are designated by the same reference characters as the corresponding terminals in the circuit of FIG. 2.

In the operation of the system of FIG. 1, the part of the transmitter signal that reaches the input terminal 21 of synchronous detector 11 by way of the incomplete isolation 7 will in general have a component that is either in phase, or 180° out of phase, with the reference signal that reaches the input terminal 23 from the transmitter line 5. If said component is in phase with the reference, the synchronous detector 11 will produce an output containing a d-c voltage of negative polarity, and of a magnitude that corresponds to the amplitude of said component.

After rejection of unwanted a-c products by the filter 12, the d-c voltage is used as the control input to the phase reversible amplitude control 8, in this case reversing the phase of the input to terminal 21. The output of device 8 at its terminal 23 thus opposes the in-phase signal component detected by the synchronous detector 11. The elements 8 and 11 act as a closed loop servo, operating to drive the resultant in-phase signal component to a null. As in any such servo, the depth of the null depends upon the loop gain, which may be augmented by suitable amplifier means, not shown.

The undesired transmitter signal on line 6 will in general have a quadrature component in addition to the above mentioned in phase or 180° out of phase component. The quadrature component has no effect on synchronous detector 11, but is detected by synchronous detector 13 because that detector receives a quadrature phased reference signal from the 90° phase shifter 9. The phase reversible amplitude control 10, also connected to phase shifter 9, provides an output that opposes the quadrature component of the undesired signal. The elements 10 and 13 operate in the same manner as elements 8 and 11, but with the quadrature component. The two servo loops cooperate to null any signal of the transmitter frequency that appears on the receiver line, regardless of its phase or amplitude.

The system of FIG. 1 will operate in the same way to cancel signals arriving from sources other than the transmitter 1, if they are of the same or very nearly the same frequency. Signals that differ by somewhat more than the cutoff frequency of the low pass filters 12 and 14, say 200 Hz, are not affected and can be utilized by the receiver 2 while the transmitter 1 is operating.

Figure 3:
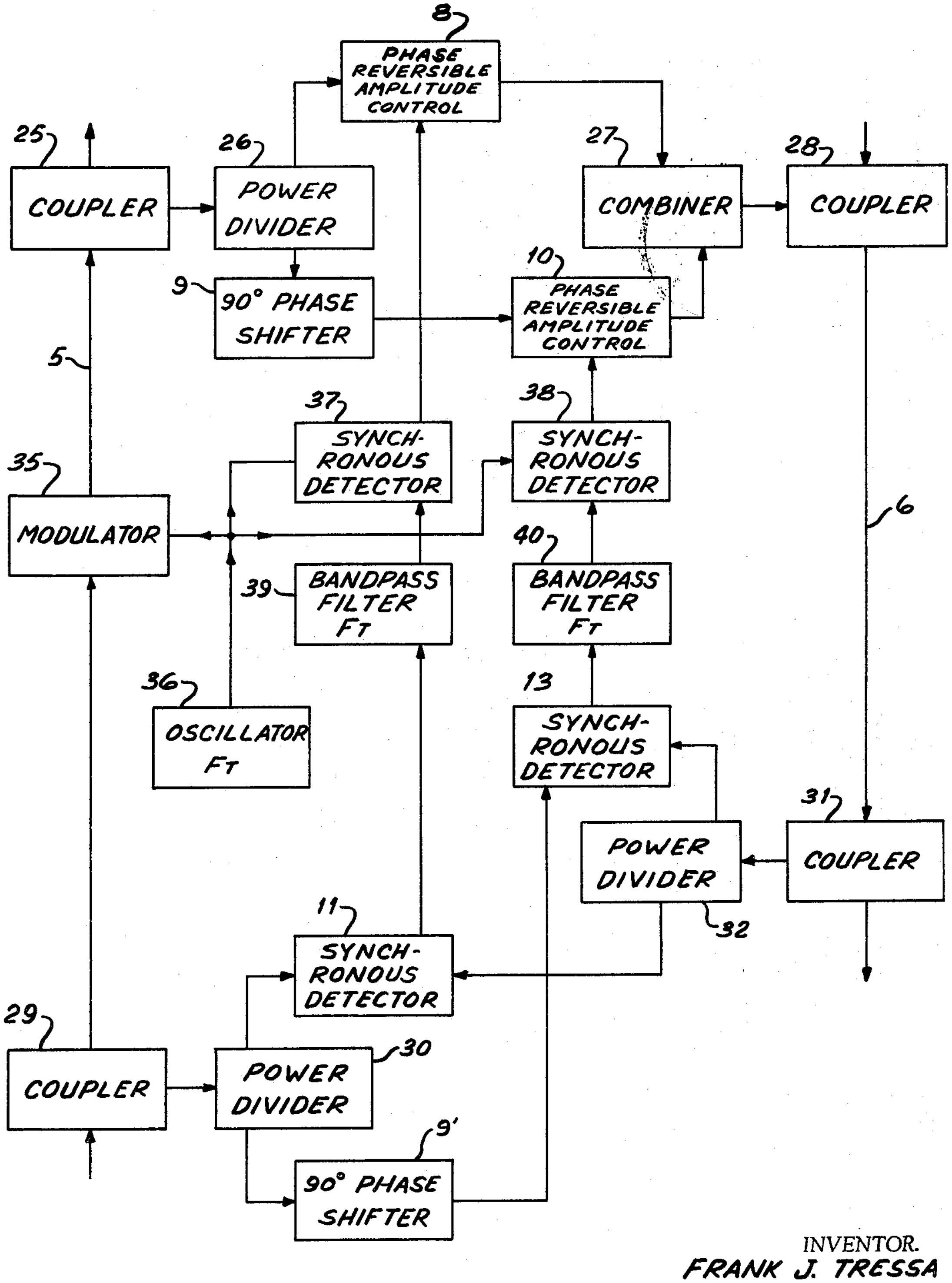
FIG. 3 is a block diagram, somewhat more detailed than FIG. 1, of a modified embodiment for use with a transmitter and receiver operating at exactly the same r-f carrier frequency.

Referring to FIG. 3, the phase reversible amplitude controls 8 and 10 in this case receive their inputs from the transmitter line 5 by way of a coupler 25 and a power divider 26. The coupler 25 may be for example a 20 db directional coupler, diverting about 1 percent of the power on line 5 to the power divider 26. The power divider may be a 3 db coupler or hybrid device, dividing the diverted power equally between the amplitude controls. The phase shifter 9, although illustrated as a discrete element, may consist of a quarter wavelength difference in the lines from the power divider to the amplitude controls. The outputs of the amplitude controls are applied to the receiver line 6 through a combiner 27 and a coupler 28, which may be structurally the same as the divider 26 and coupler 25, respectively.

Reference inputs from line 5 to the synchronous detectors 11 and 13 are similarly provided by a coupler 29 and power divider 30, and signal inputs from line 6 by a coupler 31 and power divider 32. The foregoing coupling arrangements could also be used in the system of FIG. 1, but were omitted from that description for clarity of explanation.

A modulator 35 is interposed on the transmitter line 5 between the couplers 29 and 25, and may comprise an r-f amplifier arranged to be amplitude modulated by an oscillator 36. The output of oscillator 36, hereinafter referred to as a "tag" signal, may be of some fixed frequency $F_T$ outside the modulation band normally used for conveying intelligence or communications, for example 20 KHz. The oscillator 36 also provides reference signal or switching control inputs to synchronous detectors 37 and 38.

The outputs of detectors 37 and 38 are in this case the control inputs of the phase reversible amplitude controls 8 and 10 respectively. Signal inputs to the detectors 37 and 38 are provided by the outputs of synchronous detectors 11 and 13, through band pass filters 39 and 40, respectively. Filters 39 and 40 are designed to pass a relatively narrow frequency band centered on the tag modulation frequency $F_T$.

In the operation of the system of FIG. 3, the undesired transmitter signal on line 6 carries the tag modulation, while the reference signals taken from coupler 29 do not. Accordingly, the outputs of synchronous detectors 11 and 13 include signals of the tag frequency $F_T$. The amplitudes of said signals correspond to those of the respective quadrature components of the undesired r-f signal, and their phase senses with regard to the oscillator 36 correspond to those of the respective r-f components with regard to the reference from coupler 29.

The above tag frequency signals, after filtering in filters 39 and 40, are synchronously detected against the tag frequency reference from oscillator 36 by detectors 37 and 38. The outputs of detectors 37 and 38 are d-c voltages of magnitudes and polarities representing the amplitudes and phase senses of the respective quadrature components of the undesired tag modulated r-f signal on line 6. The d-c voltages control the devices 8 and 10 to null the undesired signal as in the system of FIG. 1.

The system of FIG. 3 differs from that of FIG. 1 in that it does not null signals on line 6 that are identical to those on line 5 except without the tag modulation. Therefore relatively weak signals from some other source, carrying no tag modulation or some different tag modulation that can be rejected by filters 39 and 40, can be received, amplified and retransmitted on the identical carrier frequency and with the identical communication or intelligence modulation. The added tag modulation identifies the signal to be nulled on line 6 without affecting the otherwise similar desired signal.

I claim:

1. A system for cancelling an undesired r-f signal that is produced on a receiver line by a source of interference, comprising:

a. means for providing a signal sample portion of the output of said source, b. means for separating said signal sample into first and second quadrature components, c. first control means for controlling the amplitude and phase sense of said first quadrature component and second control means for controlling the amplitude and phase sense of said second quadrature component, d. means for applying said controlled quadrature components to said receiver line, for combination with said undesired signal to produce a resultant r-f signal, e. first and second demodulator means for producing respective outputs corresponding to quadrature components of said resultant signal, and f. means responsive to said demodulator outputs respectively for adjusting said first and second amplitude and phase sense control means to substantially nullify respective quadrature components of said undesired r-f signal.

2. The invention set forth in claim 1, further including:

a. means for modulating said source with a tag signal, whereby the outputs of said first and second demodulator means contain respective tag signal components, b. first and second means responsive respectively to said tag signal components to produce respective first and second d-c control signals, and c. means for applying said d-c control signals to said first and second amplitude and phase sense control means, respectively.

3. The invention set forth in claim 2, wherein said tag signal is of a frequency outside the band of modulating signals that are impressed on said r-f signal for carrying intelligence.

4. The invention set forth in claim 2, wherein the modulation of said source by said tag signal is amplitude modulation.

5. The invention set forth in claim 2, wherein said means responsive to said tag signal components respectively each include a synchronous detector connected to receive said tag signal as a switching control input.

* * * * *